(12) United States Patent
Park et al.

(10) Patent No.: US 10,320,251 B2
(45) Date of Patent: Jun. 11, 2019

(54) FLEXIBLE SUPPORT APPARATUS FOR SUPERCONDUCTING MAGNET IN SUPERCONDUCTING ROTATING MACHINE

(71) Applicant: INDUSTRY-ACADEMIC COOPERATION FOUNDATION CHANGWON NATIONAL UNIVERSITY, Gyeongsangnam-do (KR)

(72) Inventors: Min Won Park, Gyeongsangnam-do (KR); In Keun Yu, Gyeongsangnam-do (KR); Hae Jin Sung, Gyeongsangnam-do (KR); Byeong Soo Go, Gyeongsangnam-do (KR); Hyun Kyung Shin, Ulsan (KR)

(73) Assignee: INDUSTRY-ACADEMIC COOPERATION FOUNDATION CHANGWON NATIONAL UNIVERSITY, Gyeongsangnam-Do (KR)

( * ) Notice: Subject to any disclaimer, the term of this patent is extended or adjusted under 35 U.S.C. 154(b) by 44 days.

(21) Appl. No.: 15/793,241

(22) Filed: Oct. 25, 2017

(65) Prior Publication Data

US 2018/0175710 A1    Jun. 21, 2018

(30) Foreign Application Priority Data

Dec. 19, 2016 (KR) .......................... 10-2016-0173875

(51) Int. Cl.
*H02K 1/28* (2006.01)
*H01F 41/04* (2006.01)
(Continued)

(52) U.S. Cl.
CPC ................. *H02K 1/28* (2013.01); *H01F 6/06* (2013.01); *H02K 1/27* (2013.01); *H02K 7/086* (2013.01);
(Continued)

(58) Field of Classification Search
CPC .......... H02K 15/03; H02K 1/28; H02K 7/086; H02K 1/27; H01F 6/06; H01F 41/048; Y02E 40/62
See application file for complete search history.

(56) References Cited

U.S. PATENT DOCUMENTS

| | | | | |
|---|---|---|---|---|
| 2011/0037545 | A1* | 2/2011 | Sivasubramaniam | ...................... H01F 13/003 335/216 |
| 2011/0221552 | A1* | 9/2011 | Rochford | .................. H01F 6/06 335/216 |
| 2013/0002083 | A1* | 1/2013 | Eugene | .................... H02K 1/28 310/194 |

FOREIGN PATENT DOCUMENTS

| | | | | |
|---|---|---|---|---|
| DE | 2345082 A1 * | 3/1975 | ............. | H02K 55/00 |
| JP | 02-097004 A | 4/1990 | | |
| JP | 2016111071 A | 6/2016 | | |

\* cited by examiner

*Primary Examiner* — Mohamad A Musleh
(74) *Attorney, Agent, or Firm* — Porzio Bromberg & Newman P.C.

(57) ABSTRACT

The present disclosure relates to a flexible support apparatus for superconducting magnet in superconducting rotating machine. The present disclosure relates to a flexible support apparatus for superconducting magnet in superconducting rotating machine that includes a superconducting magnet that is located in a rotor body of a superconducting rotating machine, a vacuum container that internally stores the superconducting magnet, a first support that supports the superconducting magnet by being internally attached to the vacuum container, a third support that supports the super-
(Continued)

conducting magnet by being externally attached to the superconducting magnet, and a second support that is located between the first support and the second support and that supports the superconducting magnet by including a flexible material.

11 Claims, 6 Drawing Sheets

(51) Int. Cl.
    *H01F 6/06*           (2006.01)
    *H02K 15/03*         (2006.01)
    *H02K 7/08*          (2006.01)
    *H02K 1/27*          (2006.01)

(52) U.S. Cl.
    CPC ........... *H02K 15/03* (2013.01); *H01F 41/048* (2013.01); *Y02E 40/62* (2013.01)

FLEXIBLE SUPPORT APPARATUS FOR SUPERCONDUCTING MAGNET IN SUPERCONDUCTING ROTATING MACHINE

CROSS-REFERENCE TO RELATED APPLICATIONS

This application claims the benefit under 35 U.S.C. 119(a) of Korean Patent Application No. 10-2016-0173875 filed on Dec. 19, 2016 in the Korean Intellectual Property Office, the entire disclosure of which is incorporated herein by reference for all purposes.

BACKGROUND

1. Field

The present disclosure relates to a flexible support apparatus for superconducting magnet in superconducting rotating machine. In particular, the present disclosure relates to a flexible support apparatus for superconducting magnet in superconducting rotating machine that is capable of supporting a superconducting magnet as well as minimizing heat conduction via the structure of a plurality of supports with flexibility in order to protect or support the superconducting magnet from torque or Lorentz force that results from the rotational motion of superconducting rotating machine.

2. Description of Related Art

Superconductors having zero electrical resistance at very low temperatures are characterized by high magnetic field, low loss, miniaturization, etc., compared to conventional normal conductors, such as copper, and the superconductors have been attempted to be applied in various fields. Superconductors with the features have been studied in the application to an electric power equipment field. For example, superconductors are applied in many fields, such as a generator, motor, cable, DC reactor, fault current limiter, etc.

As superconductivity technology has been developed, superconducting application equipment becomes to have a larger capacity. In consequence, superconducting coil becomes a high magnetic field and carries high current. However, as being high magnetic field and carrying high current, there is the disadvantage that superconducting application equipment is weak on a force arising coil or external force.

In detail, a superconducting rotor is weak on an internal force resulting from the electric current and magnetic field of superconducting coil (or magnet). In addition, regarding the superconducting rotor, an external physical force, such as torque, becomes larger. The superconducting rotor is a rotating type, so the direction of force that is applied to superconducting coil (or magnet) periodically changes. Therefore, it is necessary to have the supporting structure that is able to protect a superconducting coil or magnet against a strong force or from the direction of force that periodically changes.

In addition, regarding superconductors, there is the problem that a heat load for cooling superconducting coils needs to be minimized. Therefore, it is necessary to invent a supporting structure that is capable of minimizing a heat load as well as supporting a superconducting magnet.

SUMMARY

Examples of the present disclosure are provided to introduce a flexible support apparatus for superconducting magnet in superconducting rotating machine that is capable of supporting a superconducting magnet as well as minimizing heat conduction via the structure of a plurality of supports with flexibility in order to protect or support the superconducting magnet from torque or Lorentz force that results from the rotational motion of superconducting rotating machine.

Examples of the present disclosure are provided to introduce a flexible support apparatus for superconducting magnet in superconducting rotating machine that is capable of releasing a mechanical stress and a force that periodically changes and minimizing a heat load via the structure of supports having flexibility and minimized heat conductivity, regarding high mechanical stress that superconducting rotor has and force that periodically changes, and minimized heat conductivity.

According to an example of the present disclosure, a flexible support apparatus for superconducting magnet comprising: a superconducting magnet that is located in a rotor body of a superconducting rotating machine; a vacuum container that internally stores the superconducting magnet; a first support that is attached to an inside of the vacuum container and that supports the superconducting magnet; a third support that is attached to an outside of the superconducting magnet and that supports the superconducting magnet; and a second support that is located between the first support and second support, and that includes a flexible material and supports the superconducting magnet.

The first and third supports may include a material that has a heat conductivity that is less than a predetermined heat conductivity.

The first and third supports may include a material that is one of a Glass Fiber Reinforced Polymer (GFRP), Kevlar, Zylon, stainless steel, plastic, and Mono Cast Nylon (MC Nylon).

The second support may include a material having a mechanical strength and elastic force that exceed a predetermined threshold and reduce a mechanical stress or periodic external force that is applied to the superconducting magnet by using the material having mechanical strength and elastic force.

The second support may include one of a Carbon Fiber Reinforced Polymer (CFRP), stainless steel, aluminum, brass, and ferrous metal.

The first support may include at least one first support member, and the at least one first support member may be attached to an inside of the vacuum container and may support the superconducting magnet.

The third support may include at least one third support member, and the at least one third support member may be attached to an outside of the superconducting magnet and may support the superconducting magnet.

The second support may include a flexible plate member that has a predetermined length, and the first and third supports may be attached in both sides of the plate member.

The first to third supports may be attached to both sides of the superconducting magnet and vacuum container and on the inward sides of the vacuum container.

The first to third supports may be attached to upward and downward sides of the superconducting magnet and on the inward sides of the vacuum container.

According to examples of the present disclosure, it is capable of minimizing heat conductivity as well as supporting a superconducting magnet via the structure of a plurality of supports having flexibility in order to protect or support superconducting magnet from torque or Lorentz force that results from the rotational motion of superconducting rotating machine.

According to examples of the present disclosure, it is capable of releasing a mechanical stress and force that periodically changes via the structure of support having flexibility and minimized heat conductivity, for high mechanical stress that a superconducting rotor has, and the direction of force that periodically changes and minimized heat load.

According to examples of the present disclosure, it is possible to solve problems of mechanical stress resulting from Lorentz force due to high magnetic field and high current.

According to examples of the present disclosure, it is possible to remedy the shortcoming of being weak on mechanical stress as physical forces (such as torque) of superconducting magnet and the direction of forces periodically change.

According to examples of the present disclosure, it is capable of making up for the fact that superconducting magnet is required to have a minimized heat load as well as to endure a high mechanical force, and it is capable of solving problems of other superconducting application equipment.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Figure 1:
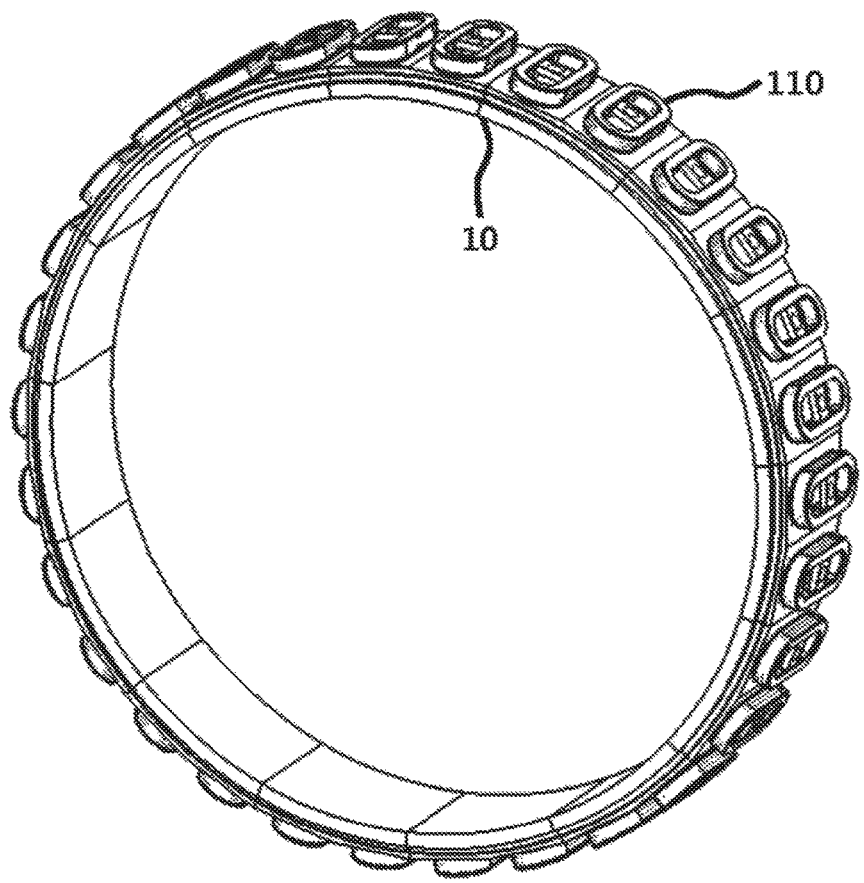
FIG. 1 is a drawing illustrating an entire shape of superconducting rotor in a superconducting rotating machine except a vacuum container according to an example of the present disclosure.

FIG. 1 is a drawing illustrating an entire shape of superconducting rotor in a superconducting rotating machine except a vacuum container according to an example of the present disclosure.

As illustrated in FIG. 1, a superconducting rotating machine may include a rotor body 10 and a superconducting magnet 110.

The superconducting rotating machine may have the structure where a plurality of superconducting magnets 110 are in the rotor body 10. The rotor body 10 has the structure that surrounds bottom sides of the plurality of superconducting magnet inwardly. The rotor body 10 may support and rotate the plurality of superconducting magnets 110.

The superconducting magnet 110 include a plurality of superconducting magnets 110 and is located in the rotor body 10. The plurality of neighboring superconducting magnets 110 is in the form of a circle.

Figure 2:
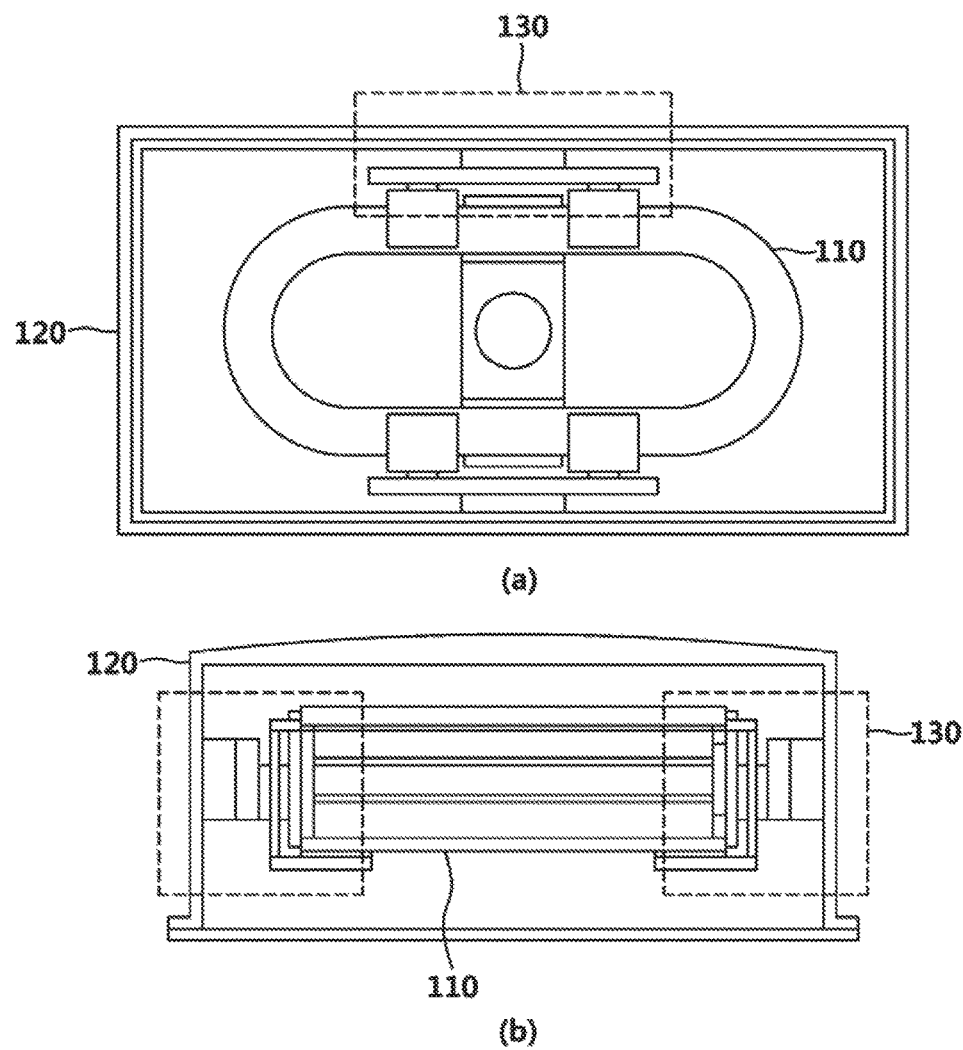
FIG. 2 is drawings illustrating top and front views of the structure of a superconducting magnet to which a support is attached according to an example of the present disclosure.

FIG. 2 is drawings illustrating top and front views of the structure of a superconducting magnet to which a support is attached according to an example of the present disclosure.

All superconducting application equipment, in detail, the structure of support with flexibility for supporting the superconducting magnet 110 in a superconducting rotating machine are illustrated in (a) and (b) of FIG. 2.

The vacuum container 120 internally stores one superconducting magnet 110. A flexible support structure 130 that supports a superconducting magnet is attached between the superconducting magnet 110 and the vacuum container 120.

Figure 3:
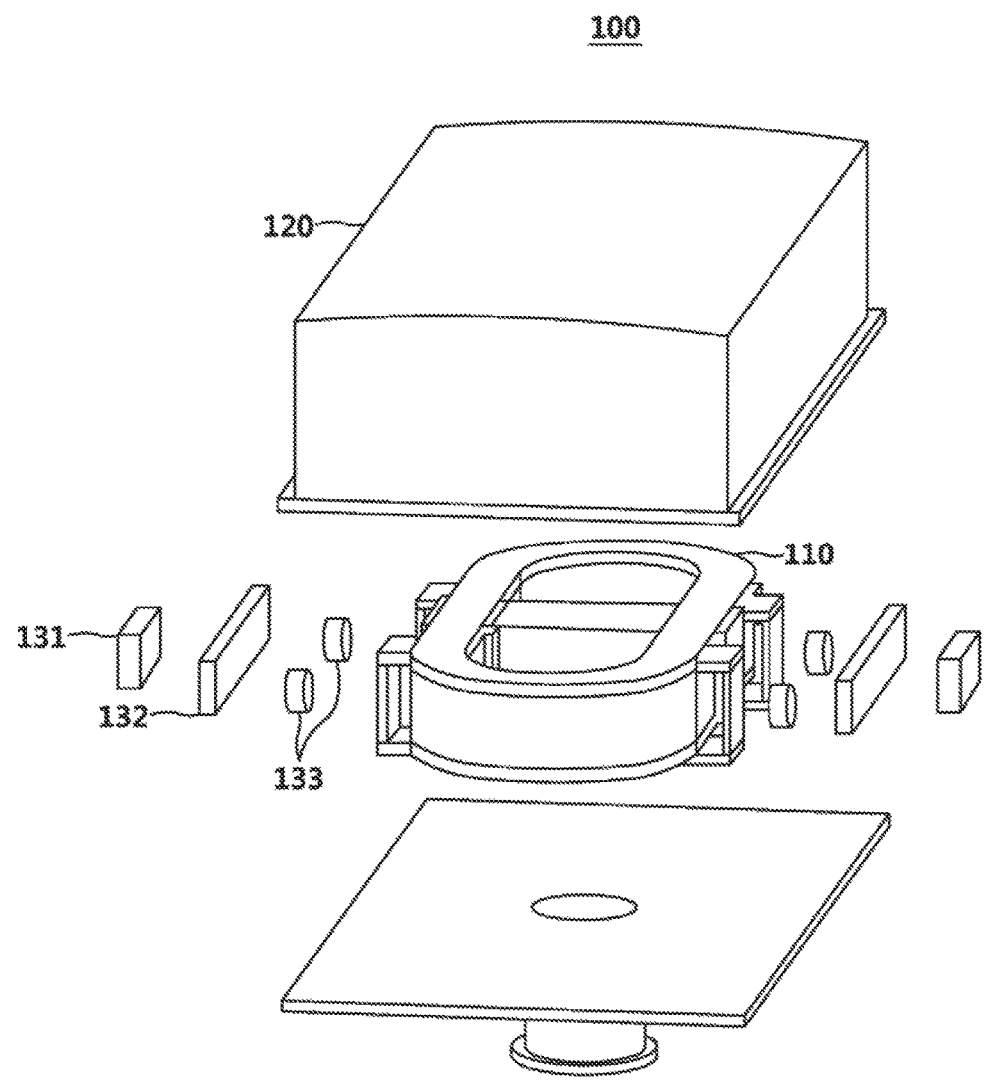
FIG. 3 is a drawing illustrating an exploded perspective view of a flexible support of superconducting magnet according to an example of the present disclosure.

FIG. 3 is a drawing illustrating an exploded perspective view of a flexible support of superconducting magnet according to an example of the present disclosure.

Figure 4:
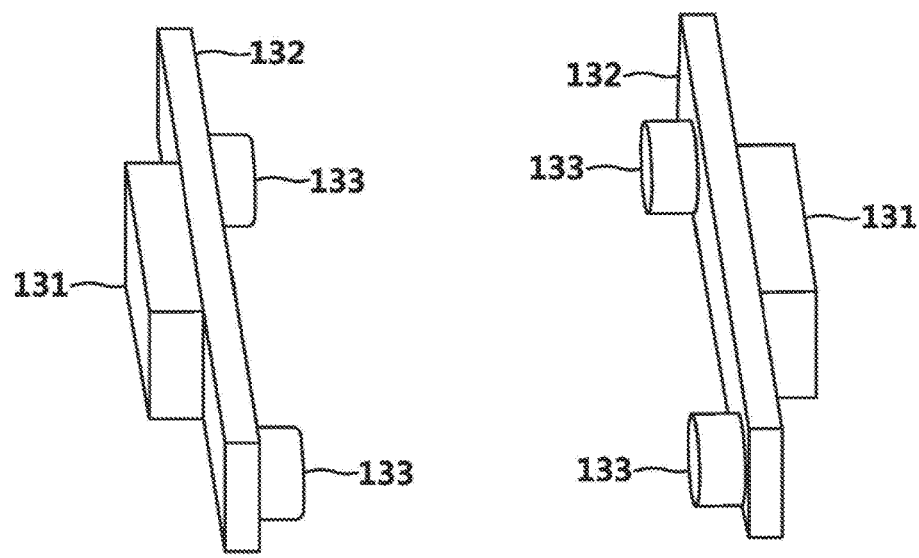
FIG. 4 is a drawing illustrating the structure of a flexible support in a flexible support apparatus of superconducting magnet according to an example of the present disclosure.

FIG. 4 is a drawing illustrating a flexible support structure 130 in a flexible support apparatus of superconducting magnet according to an example of the present disclosure.

As illustrated in FIGS. 3 and 4, a flexible support apparatus 100 for superconducting magnet in a superconducting rotating machine according to an example of the present disclosure may include a superconducting magnet 110, a vacuum container 120, and a flexible support structure 130. Herein, the flexible support structure 130 may include a first support 131, a second support 132, and a third support 133.

The flexible support apparatus 100 according to an example of the present disclosure may include a flexible support structure 130 that is capable of minimizing a high mechanical stress and heat load applied to the superconducting magnet 110 that is a high magnetic field and carries high current.

Hereinafter, details of features and operations of each element of the flexible support apparatus 100 of FIGS. 3 and 4 are described.

The superconducting magnet 110 may be located in a rotor body 10 of a superconducting rotating machine.

The vacuum container may store the superconducting magnet 110 inside the vacuum container.

In order to release a mechanical stress, overcome the direction of force that periodically changes, and minimize a heat load, the flexible support structure 130 may include the first support 131, the second support 132, and the third support 133, and, thereby, it is capable of releasing a mechanical stress, overcoming the direction of force that periodically changes, and minimizing a heat load.

The flexible support structure 130 may support the superconducting magnet 110 by connecting a plurality of flexible supports to a portion of superconducting magnet 110 that needs a support with flexibility, for example, to the top side and bottom side, or to the left side and right side of the superconducting magnet 110.

The flexible support structure 130 may largely include two first support element and one second support element.

The first support element is directly attached to the superconducting magnet 110 and to a structure of which point to situate the superconducting magnet 110 by using a material whose heat conductivity is lower than a predetermined heat conductivity, for example, Glass Fiber Reinforced Plastic (GFRP). Herein, the first support element may include the first support 131 and second support 132.

The second support element may reduce high mechanical stress and situate support elements having high mechanical strength and elastic force, for example, Carbon Fiber Reinforced Plastic (CFRP) between two first support elements by considering the direction of force that periodically changes. This structure may provide an unlimited possibility of application in the fields of high magnetic field, high current, and high strength and may solve the weakness of superconducting magnet 110, such as features of structural strength and heat.

In detail, referring to each individual support of the flexible support structure 130, the first support 131 may support the superconducting magnet 110 by being internally attached to the vacuum container 120.

The third support 133 may support the superconducting magnet 110 by being externally attached to the superconducting magnet 110.

The second support 132 may be located between the first support 131 and the second support 132, and it may include flexible material and support the superconducting magnet 110.

Here, details of the first support 131 and third support 133 are described below.

The first support 131 and third support 133 may include a material that has a heat conductivity is lower than a predetermined heat conductivity. In addition, the heat conductivity of the third support 133 may be lower than or equal to the heat conductivity of the first support 131. The first support 131 and third support 133 may be directly attached to the superconducting magnet 110 and a structure of location for situating the superconducting magnet 110 by using a material whose heat conductivity is low, such as GFRP.

The first support 131 and third support 133 may have a material that is any one of GFRP, Kevlar, Zylon, stainless steel, plastic, and Mono Cast Nylon (MC Nylon).

Details of the second support 132 are provided below.

The second support 132 may include a material whose mechanical strength and elastic force that exceed a predetermined threshold. The second support 132 may reduce a mechanical stress or periodic force applied to the superconducting magnet 110 via a material that has mechanical strength and elastic force. The second support 132 may support the superconducting magnet 110 by situating a support member that has high mechanical strength and elastic force, such as CFRP, between the first support 131 and the third support 133.

The second support 132 may include a material that is one of CFRP, stainless steel, aluminum, copper, brass, and ferrous metal.

Here, the first to third supports 131 to 133 may comprise other metals and nonmetals as well as GFRP and CFRP.

As described above, the flexible support apparatus 100 may release the mechanical stress and the periodically changing force by including the first support 131 and third support 133 which directly support and are connected to a superconducting magnet 110 and by positioning the flexible second support 132 between the first and third supports which leads to the change in a location of superconducting magnet 110.

Hereinabove, the flexible support apparatus 100 for superconducting magnet 110 in superconducting rotating machine according to an example of the present disclosure are described in detail, referring to FIGS. 1 to 4. However, the above description is merely one aspect of the present disclosure to provide understanding and explanation of the present disclosure for convenience, and the present disclosure shall not be limited to the example.

For example, the first support 131 of FIGS. 3 and 4 includes a support member, and the third support 133 includes two support members. The first support 131 and third support 133 may include at least one support member.

The first support 131 may include at least one first support member. The first support 131 may support the superconducting magnet 110 by internally attaching at least one first support member to the vacuum container 120.

As another example, the second support 132 may include a flexible plate member that has a predetermined length. The first support 131 and third support 133 may be attached both sides of a plate member of the second support 132.

FIGS. 5 to 8 are exploded perspective views illustrating a flexible support apparatus of superconducting magnet per location where supports are attached.

The flexible support structure 130 according to an example of the present disclosure may be attached to both sides of the superconducting magnet or to top and bottom sides of the superconducting magnet. The location of attaching the flexible support structure 130 may be any portion of the superconducting magnet 110 and is not limited to a specific location. The exploded perspective views depending on locations of attachment of supports are described by referring to FIGS. 5 to 8.

Figure 5:
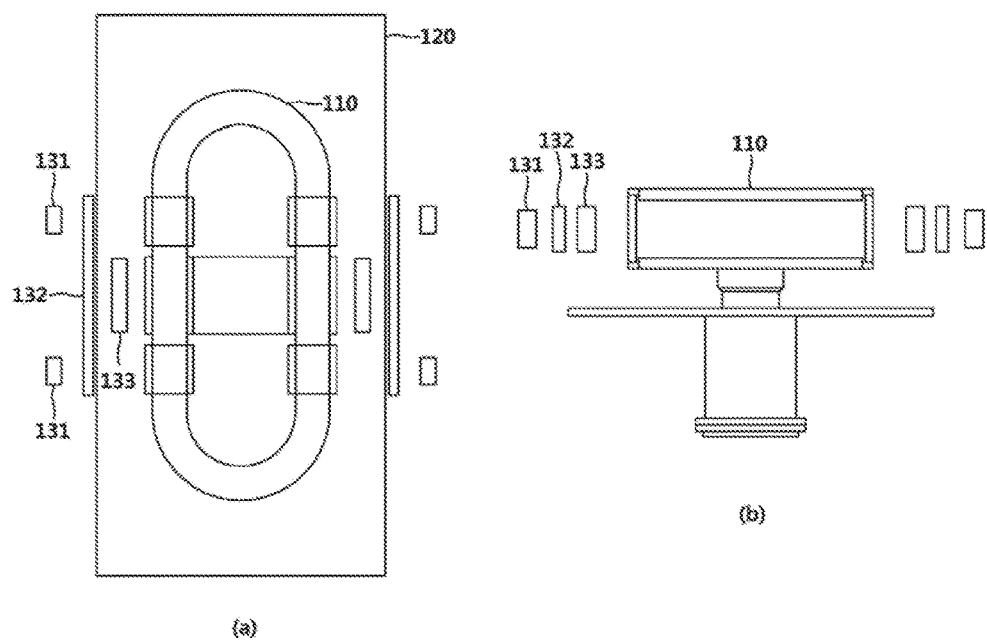
FIGS. 5 to 8 are exploded perspective views illustrating a flexible support apparatus of superconducting magnet per location where supports are attached.

As illustrated in FIG. 5, the first to third supports 131 to 133 may be attached to both sides of the superconducting magnet 110 and vacuum container 120 and on the inward sides of the vacuum container 120.

The first support 131 may include at least one first support member. For example, the first support 131 may include two or three first support members, and the number of first support members is not limited to be specific. At least one first support member may be internally attached to the vacuum container 120 to support the superconducting magnet 110.

Figure 6:
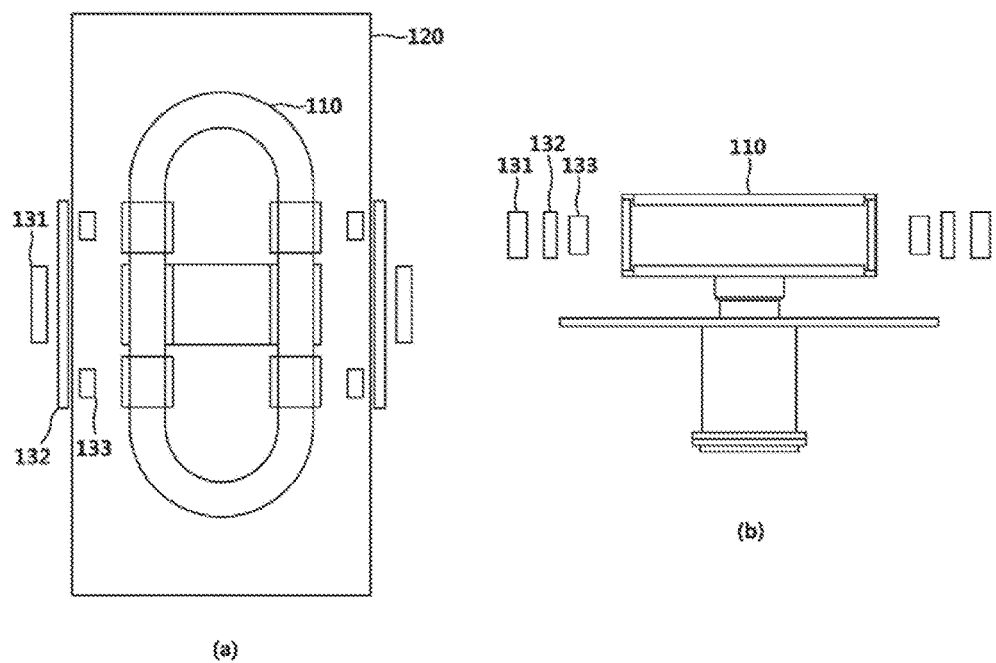

As illustrated in FIG. 6, the first to third supports 131 to 133 may be attached to both sides of superconducting magnet 110 and vacuum container 120 and on the inward sides of vacuum container 120.

The third support 133 may include at least one third support member. For example, the third support 133 may include at least two or three third support members, and the number of third support members is not limited to be specific. At least one third support member may support the superconducting magnet 110 by being externally attached to the superconducting magnet 110.

Figure 7:
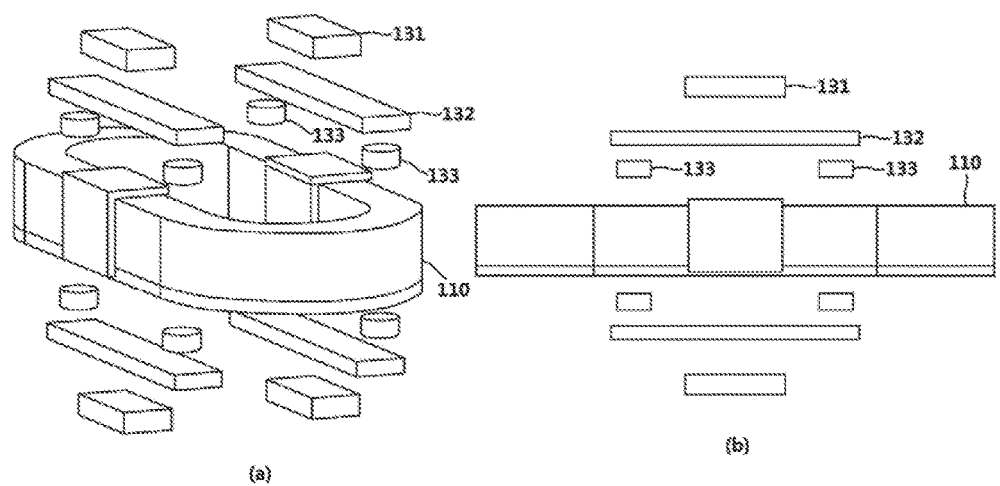

As illustrated in FIG. 7, the first to third supports 131 to 133 may be attached to upward and downward sides of superconducting magnet 110 and on the inward sides of the vacuum container 120.

The third support 133 may include at least one third support member. For example, the third support 133 may include at least two or three third support members, and the number of third support members is not limited to be specific.

At least one third support member support the superconducting magnet 110 by being externally attached to the superconducting magnet 110.

Figure 8:
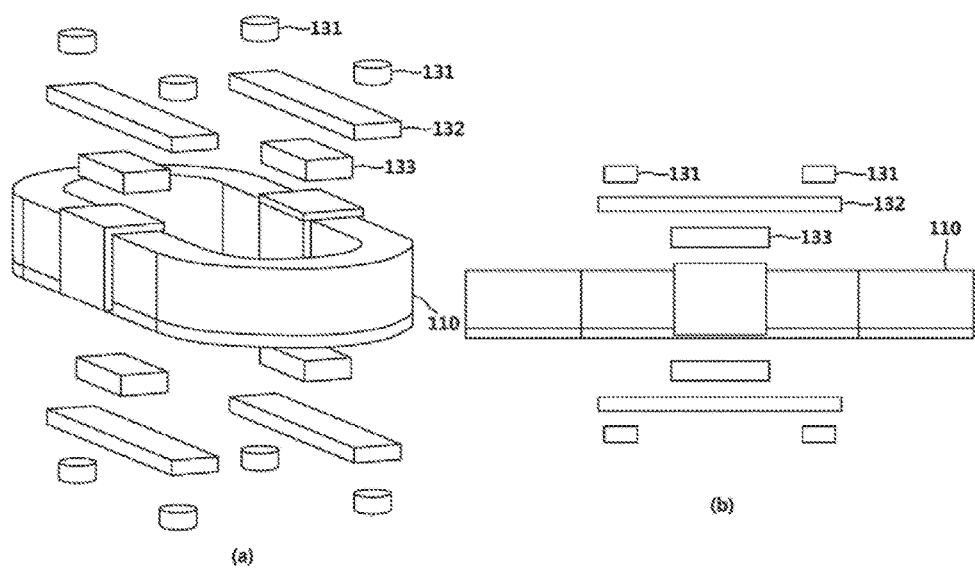

As illustrated in FIG. 8, the first to third supports 131 to 133 may be attached to upward and downward sides of superconducting magnet 110 and on the inward sides of the vacuum container 120.

The first support 131 may include at least one first support member. For example, the first support 131 may include at least two or three first support members, and the number of first support members is not limited to be specific. At least one first support member may support the superconducting magnet 110 by being internally attached to the superconducting magnet 110.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims. Accordingly, the scope of the present disclosure shall be determined only according to the attached claims.

What is claimed is:

1. A flexible support apparatus for superconducting magnet in superconducting rotating machine comprising:
   a superconducting magnet that is located in a body of a rotor of a superconducting rotating machine;
   a vacuum container that internally stores the superconducting magnet;
   a first support that is attached to an inside of the vacuum container and that supports the superconducting magnet;
   a third support that is attached to an outside of the superconducting magnet and that supports the superconducting magnet; and
   a second support that is located between the first support and the second support, and that comprises a flexible material and supports the superconducting magnet.

2. The flexible support apparatus for superconducting magnet of claim 1, wherein the first and third supports comprise a material that has a heat conductivity that is less than a predetermined heat conductivity.

3. The flexible support apparatus for superconducting magnet of claim 1, wherein a heat conductivity of the third support is less than or equal to a heat conductivity of the first support.

4. The flexible support apparatus for superconducting magnet of claim 1, wherein the first and third supports comprise a material that is one of a Glass Fiber Reinforced Polymer (GFRP), Kevlar, Zylon, stainless steel, plastic, and Mono Cast Nylon (MC Nylon).

5. The flexible support apparatus for superconducting magnet of claim 1, wherein the second support comprises a material having a mechanical strength and elastic force that exceed a predetermined threshold, and reduces a mechanical stress or regular external force that is applied to the superconducting magnet by using the material having mechanical strength and elastic force.

6. The flexible support apparatus for superconducting magnet of claim 1, wherein the second support that comprises one of a Carbon Fiber Reinforced Polymer (CFRP), stainless steel, aluminum, copper, brass, and ferrous metal.

7. The flexible support apparatus for superconducting magnet of claim 1,
   wherein the first support comprises at least one first support member, and
   wherein the at least one first support member is attached to the inside of the vacuum container and supports the superconducting magnet.

8. The flexible support apparatus for superconducting magnet of claim 1,
   wherein the third support comprises at least one third support member, and
   wherein the at least one third support member is attached to the outside of the superconducting magnet and supports the superconducting magnet.

9. The flexible support apparatus for superconducting magnet of claim 1,
   wherein the second support that comprises a flexible plate member that has a predetermined length, and
   wherein the first and third supports are attached to both sides of the plate member.

10. The flexible support apparatus for superconducting magnet of claim 1, wherein the first to third supports are attached to both sides of the superconducting magnet and vacuum container and on inward sides of the vacuum container.

11. The flexible support apparatus for superconducting magnet of claim 1, wherein the first to third supports are attached to upward and downward sides of the superconducting magnet and on inward sides of the vacuum container.

* * * * *